June 25, 1929.   R. C. BAKER   1,718,771
FISHING APPARATUS FOR DEEP WELLS
Filed June 15, 1927
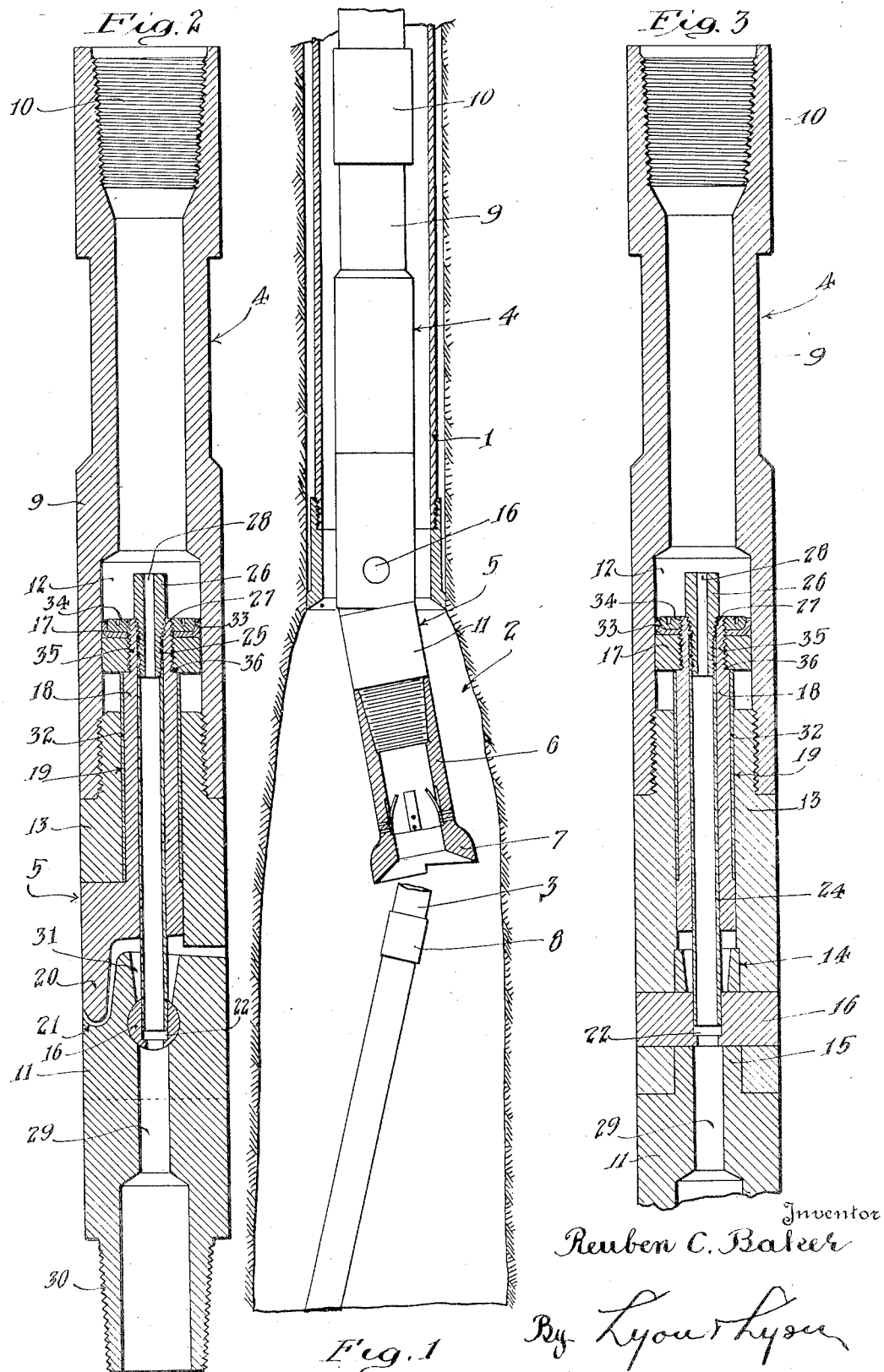

Patented June 25, 1929.

1,718,771

UNITED STATES PATENT OFFICE.

REUBEN C. BAKER, OF COALINGA, CALIFORNIA.

FISHING APPARATUS FOR DEEP WELLS.

Application filed June 15, 1927. Serial No. 198,890.

This invention relates to fishing apparatus for recovering a lost part or "fish" in the bottom of a well.

In drilling oil wells or other deep wells it may happen that a lost part or "fish", for example, a section of tool string, may be located below the lower end of the casing and its upper end may become shifted off laterally so that it is not in line with the casing and cannot be reached by ordinary fishing methods.

The general object of this invention is to provide simple fishing apparatus for enabling this difficulty to be overcome. A further object of the invention is to provide apparatus of this kind having means for connecting the fishing tool in such a way that the lower end of the fishing tool can be projected or offset laterally beyond the lower end of the casing so that it could reach a "fish" located in the cavity below the lower end of the casing and out of line with the bore of the casing; also to provide such means with a construction enabling it to be operated by hydraulic pressure developed within the tool string and at the same time to provide for circulation down through the connection to the fishing tool.

Further objects of the invention will appear hereinafter.

The invention consists in the novel parts and combination of parts to be described hereinafter, all of which contribute to produce an efficient fishing apparatus for deep wells.

A preferred embodiment of the invention is described in the following specification, while the broad scope of the invention is pointed out in the appended claims.

In the drawing:

Figure 1 is a vertical section taken at the bottom of a well and illustrating my fishing apparatus within the casing.

Figure 2 is a vertical section through the apparatus embodying my invention and upon an enlarged scale.

Figure 3 is a view similar to Figure 2, but taken in a vertical plane at right angles to the plane in which Figure 2 is taken.

Referring to Figure 1, 1 represents the lower end of the well casing. To illustrate the manner in which my invention would be employed, let us suppose that there is a cavity 2 formed below the lower end of the casing 1 and in this cavity lies the upper end 3 of a twisted off section of drill tubing. According to my invention, I provide the lower end of the tool string 4 within the casing with a specially constructed connection 5 for connecting a fishing tool 6 to the tool string. This connection is constructed in such a way as to permit the upper end of the fishing tool 6 to swing on an axis, thereby enabling its lower end to be projected laterally, or offset, to one side of the line of the casing. This enables a bell 7 on the lower end of the fishing tool to be brought in line with the upper end of the "fish" 3. The length of the fishing tool 6, for example, an overshot, should be sufficient to enable the overshot to take the length of one section of the "fish", that is to say, to enable the lost string of tubing to pass up into the over-shot until the collar 8 passes above the grippers of the over-shot. Any suitable construction can be used to form the connection 5 which enables the fishing tool to have this mode of operation and I do not limit myself to the use of any partitcular kind of a fishing tool. My invention may be used with any type of fishing tool.

Referring to Figures 2 and 3, I shall now describe the preferred embodiment of my invention. The upper part of the connection 5 is in the form of a sub 9 which consists of a mandrel having means at its upper end, for example, a threaded box 10, to enable it to be connected to the lower end of a tool string. Below this sub I provide a head 11 which is connected to the sub by a joint permitting the head to swing on a horizontal axis. When the tool string is being passed down, the head and the sub are in axial alignment, but when the fishing tool arrives at the bottom of the well, means is brought into operation that swings the head on its axis, thereby causing the lower end of the fishing tool to be offset out of line with the well tubing (see Figure 1). In order to accomplish this, the sub 9 is made of tubular form with a bore through it which may be enlarged, if desired, to form a hydraulic cylinder, or barrel, 12, said barrel being formed just above a plug 13 which is threaded into the bore of the sub and which forms the lower end of the sub. The lower end of the sub is formed with a diametrically disposed slot 14 (see Figure 3). The upper end of the head 11 is formed with a tongue 15 that extends up into this slot and this tongue is secured in the slot by means of a transverse horizontal pin 16. In order to swing the head 11 on the axis of the pin when desired, the barrel 12 is provided with a plunger consisting of a piston 17 having a neck 18 that extends down from it and is guided through a guide opening 19 in the plug 13. At its lower end the neck 18 has a laterally disposed extension 20 located out of line with the longitudinal axis of the sub, and lies in a position to engage against a shoulder 21 on the head also located to one side of the axis of the pin. With this construction it will be evident that when the piston 17 is moved downwardly the part 20 will engage the shoulder 21 and cause the head 11 to swing on the axis of the pin.

In order to provide for conducting circulating water down through the sub and through the joint formed at the pin 16, and at the same time to provide means for adjusting the amount of swing of the head 11 on the axis of the pin, I provide the pin 16 with a transverse opening 22, that is to say, this opening passes diametrically through the pin at its middle point (see Figure 3). Near the lower end of the bore 22 an annular shoulder is formed which operates as a stop for the lower end of the tube 24 that passes down through the neck 18. The upper end of this tube 24 has a threaded connection 25 with the lower end of a plug 26, said plug having a tapered threaded connection 27 with the upper end of the neck 18. The plug 26 has a small bore 28 through it which conducts water down through the tube 24. Below the pin 16 the head 11 is formed with a duct 29 for receiving this water and carrying it on down through the threaded pin 30 that connects the head 11 to the upper end of the fishing tool 6.

In order to permit the head 11 to swing on the axis of the pin, an enlarged opening 31 is formed at its upper end, through which the tube 24 extends. This provides clearance for the tube as the head swings on its axis.

The neck 18 may, if desired, be encased in a tube or bushing 32 of non-corrosive material.

The piston 17 may be provided on its upper side with a cup leather 33 held in place by a nut 34, received on a threaded tip 35 that extends up from the upper end of the neck 18. This tip is of reduced diameter so that an annular shoulder 36 is formed, on which the piston 17 seats.

In the use of the tool the upper end of the sub 9 is attached to the lower end of the tool string and the string is then lowered down the well casing. When it has been lowered to the proper depth the water under pressure is admitted to the sub and the pressure which it exerts in the barrel 12 forces the piston 17 down. This will cause the extension 20 to engage the shoulder 21 and rock the head 11 on the axis of the pin 16. This will cause the lower end of the fishing tool 6 to become offset from the line of the casing, and enable the tool to be used in the manner illustrated in Figure 1.

When the lower end of the tube 24 strikes the shoulder 23 this will limit the amount of swinging movement that can be given to the fishing tool.

This amount of movement can be adjusted by screwing the tube 24 up or down on the threads 25 in the lower end of the plug 26.

It is understood that the embodiment of the invention described herein is only one of the many embodiments this invention may take, and I do not wish to be limited in the practice of the invention, nor in the claims, to the particular embodiment set forth.

What I claim is:

1. In fishing apparatus for deep wells, the combination of a sub having means at its upper end for attaching it to a tool-string to be lowered in the well casing, said sub having a bore therein to receive water under pressure coming down the tool-string, a head pivotally connected with the lower end of the sub to swing on a substantially horizontal axis, a plunger movably mounted in the sub and operating to move downwardly under the action of the water under pressure to engage the head and swing the same on its pivotal axis, said plunger and head having means for conducting circulating water down through the same.

2. In a fishing apparatus for deep wells, the combination of a sub having means at its upper end for attaching it to a tool-string to be lowered in a well casing, said sub having a bore to receive water under pressure coming down the tool-string, a head below the sub, a substantially horizontal pin connecting the head to the sub to enable the head to swing on the axis of the pin, a plunger having a neck guided to slide in the sub and having a piston at its upper end moving in the bore to receive water under pressure, said neck having an extension to engage the head located out of line with the axis of the pin, to swing the head on the pin, said pin having a transverse opening extending through it in a substantially vertical direction, a tube extending down through the neck with its lower end received in the opening through the pin for conducting circulating water down through the piston and through the pin, said head having a duct below the pin for receiving the circulating water that passes down through the pin.

Signed at Los Angeles, Calif., this 24 day of May, 1927.

REUBEN C. BAKER.